US006738779B1

(12) United States Patent
Shapira

(10) Patent No.: US 6,738,779 B1
(45) Date of Patent: May 18, 2004

(54) APPARATUS FOR AND METHOD OF MULTIPLE PARALLEL STRING SEARCHING

(75) Inventor: Yaniv Shapira, Bet Dagan (IL)

(73) Assignee: Telecom Italia S.p.A., Milan (IT)

( * ) Notice: Subject to any disclaimer, the term of this patent is extended or adjusted under 35 U.S.C. 154(b) by 621 days.

(21) Appl. No.: 09/790,064

(22) Filed: Feb. 21, 2001

(51) Int. Cl.[7] .............................................. G06F 17/30
(52) U.S. Cl. ........................ 707/101; 707/102; 707/10
(58) Field of Search ................................ 707/101, 102, 707/10, 6, 2, 1; 713/189, 200, 201; 702/188; 379/88.01; 710/11; 358/1.18

(56) References Cited

U.S. PATENT DOCUMENTS

| | | | |
|---|---|---|---|
| 4,433,392 A | 2/1984 | Beaven | 364/900 |
| 5,414,704 A | 5/1995 | Spinney | 370/60 |
| 5,450,399 A | 9/1995 | Sugita | 370/60.1 |
| 5,469,354 A | 11/1995 | Hatakeyama et al. | 364/419.19 |
| 5,521,597 A | 5/1996 | Dimitri | 341/51 |
| 5,594,899 A | 1/1997 | Knudsen et al. | 395/600 |
| 5,604,910 A | 2/1997 | Kojima et al. | 395/800 |
| 5,708,829 A | 1/1998 | Kadashevich et al. | 395/793 |
| 5,842,040 A * | 11/1998 | Hughes et al. | 710/11 |
| 6,031,625 A * | 2/2000 | Sherman et al. | 358/1.18 |
| 6,047,283 A | 4/2000 | Braun | 707/3 |
| 6,154,747 A | 11/2000 | Hunt | 707/100 |
| 6,556,990 B1 * | 4/2003 | Lane | 707/6 |
| 6,633,885 B1 * | 10/2003 | Agrawal et al. | 707/102 |
| 6,691,103 B1 * | 2/2004 | Wozny | 707/2 |
| 2003/0014662 A1 * | 1/2003 | Gupta et al. | 713/200 |
| 2003/0108164 A1 * | 6/2003 | Laurin et al. | 379/88.01 |

FOREIGN PATENT DOCUMENTS

JP   10-126442   5/1998   ......... H04L/12/56

OTHER PUBLICATIONS

Paul B. Anderson, "Parallel hashed key access on the connection machine" Feb. 1989, IEEE, CH2649, pp. 643–645.*
IBM Technical disclosure bulletin, "An algorithm for detecting high frequency strings in data" Jun. 2001, IBM Technical disclou bulletin, issure: 446, p. No. 1074, pp. 1–4.*

* cited by examiner

Primary Examiner—Diane D. Mizrahi
(74) Attorney, Agent, or Firm—Howard Zaretsky; Zaretsky & Associates PC

(57) ABSTRACT

An apparatus for and method of simultaneously searching an input character stream for the presence of multiple strings. The strings to be searched for are determined a priori, processed and stored in substring tables during a configuration phase. The strings to be searched for are divided into a plurality of two and three character substrings and stored in substring tables. A hash of each substring is calculated and stored in a hash table whose output is an index to a substring table. During searching, the content filter generates the hash of the input character stream and attempts to find a matching substring stored in the hash table. A string is declared found if all the substrings making up the string have been received in correct consecutive order.

36 Claims, 6 Drawing Sheets

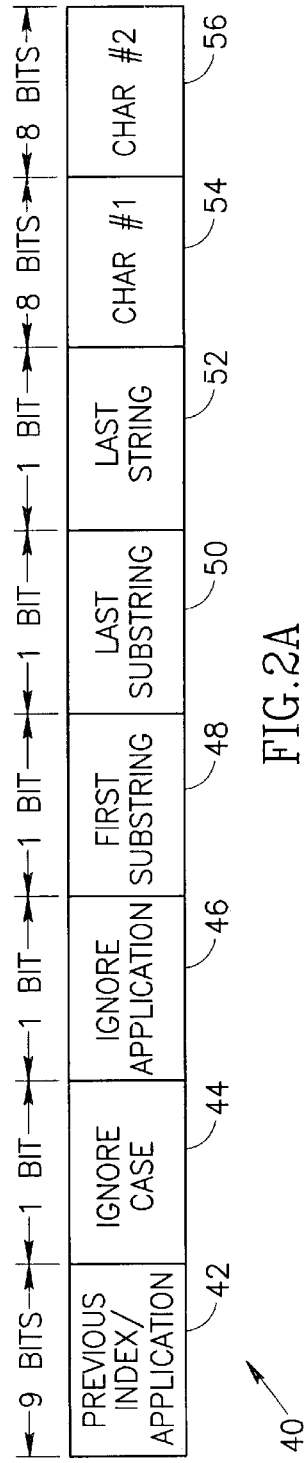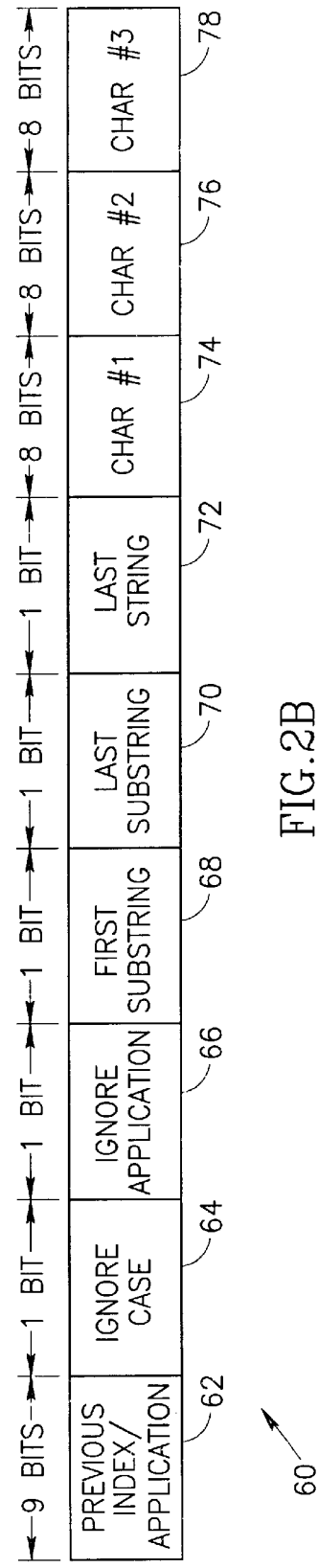

APPARATUS FOR AND METHOD OF MULTIPLE PARALLEL STRING SEARCHING

FIELD OF THE INVENTION

The present invention relates generally to data communication systems and more particularly relates to an apparatus for and a method of searching an input data stream for multiple strings in parallel.

BACKGROUND OF THE INVENTION

Many data communications processing applications require that the input data stream be filtered so as to detect the presence of a set of strings. An example of such an application is a firewall. One of the functions of a firewall is to prevent the entry of packets whose criteria violate a set of packet filtering rules. The strings may comprise, for example, the keywords specified by a particular protocol. Different applications and protocols have different keywords or other types of strings associated with them. An application such as a firewall is typically required to recognize these strings in the input data stream. The detection of one or more particular strings may trigger certain subsequent events, such as discarding the packet if it violates a packet filtering rule, opening a session (upon the recognition of an FTP control message, for example), etc.

To meet this requirement, a plurality of strings must be searched for simultaneously. Thus, the search for all possible strings must be performed in parallel regardless of the number of possible strings.

The content search of an input data stream has many applications. One major application is in cellular telephones and other wireless type devices. In recent years, the world has witnessed explosive growth in the demand for wireless communications and it is predicted that this demand will increase in the future. There are already over 500 million users that subscribe to cellular telephone services and the number is continually increasing. Eventually, in the not too distant future the number of cellular subscribers will exceed the number of fixed line telephone installations.

Other related wireless technologies have experienced growth similar to that of cellular. For example, cordless telephony, two way radio trunking systems, paging (one way and two way), messaging, wireless local area networks (WLANs) and wireless local loops (WLLs). In addition, new broadband communication schemes are rapidly being deployed to provide users with increased bandwidth and faster access to the Internet. Broadband services such as xDSL, short-range high-speed wireless connections, high rate satellite downlink (and the uplink in some cases) are being offered to users in more and more locations.

Many of these technologies are able to connect users to public networks such as the Internet. It is desirable to be able to filter the downstream data in order to prevent hackers or other non-authorized users from accessing the communications device (e.g., Internet enabled cellular phone, PDA, etc.). This can be achieved by putting a firewall in each device to prevent malicious access to the device. As described above, the operation of a firewall requires recognizing a set of strings in the input data stream.

Therefore, there is a need for an effective and computationally efficient mechanism of simultaneously searching an input data stream for the presence of a plurality of strings.

SUMMARY OF THE INVENTION

The present invention provides a novel and useful apparatus for and method of searching an input character stream for multiple strings in parallel. The present invention is embodied in a content filter which is suitable for use in applications where an input data string is to be searched for the presence of one or more strings. For example, the content filter can be used in data communication systems to provide a real time search mechanism for searching the payload content of frames or packets in an input data stream for the presence of relevant strings of one or more communication protocols. The content filter is operative to simultaneously search for a given set of strings contained within the input stream. The resulting output comprises a list of the matching strings found.

The content filter is operative to search the input data stream for a plurality of strings simultaneously. The strings to be searched for are determined a priori, processed and stored in substring tables during a configuration phase of the content filter. During configuration, the strings to be searched for are divided into a plurality of two and three character substrings. The substring tables function to store the data structures representing these three and two character substrings. The hash of these substrings are generated and stored in hash tables used to provide an index into the substring tables.

During searching, the content filter generates the hash of the input character stream and attempts to find a matching substring stored in the table. Thus, hash functions are used both in configuring the filter and during the actual searching of the input data stream to determine whether a particular string is present in the data stream.

The location index and a time to live field are stored in a temporary register for each matching substring found. Subsequent matching substrings are checked with the existing set of temporary registers to determine if they have been received in correct consecutive order. For a substring to be considered in the correct consecutive order, a temporary register must be found whose index matched that of the previous index field of the newly found substring. In addition, the TTL field must be the proper value.

If the index and TTL fields verify correctly, it is then checked if the substring is the last in the string. If it is, the string is declared as found and the index of the last substring and its location in the input stream (e.g., location in the payload of a frame) is stored in a status register. Depending on the application, the information can then be forwarded to another module for further processing.

If the substring is not the last in the string, the index and TTL field of the substring are stored in a temporary register. The TTL field is decremented at each character clock cycle and if it reaches zero, the content of the corresponding temporary register is discarded. Thus, the content search processor guarantees that the substrings making up a string are in the correct consecutive order in order for a string to be declared as found.

The invention can be implemented in either hardware or software. In one embodiment, a computer comprising a processor, memory, etc. is operative to execute software adapted to perform the multiple simultaneous string search method of the present invention.

There is therefore provided in accordance with the present invention a method of searching for one or more strings in an input data stream, the method comprising the steps of generating a first hash value on three previous characters received in the input data stream and applying the first hash value to a first hash table, generating a second hash value on two previous characters received in the input data stream and applying the second hash value to a second hash table, retrieving a three character substring stored in a first string table in response to a hit on the first hash table, retrieving a two character substring stored in a second string table in response to a hit on the second hash table and searching for substrings making up a string and declaring a string found if all the one or more two or three character substrings of a particular string are found in correct consecutive order.

There is also provided in accordance with the present invention a method of searching for one or more strings in an input data stream, the method comprising the steps of dividing each string to be searched for into one or more substrings of three or two characters and storing the three or two character substrings in a string table in accordance with the hash function thereof, generating a first hash on three previous characters of the input data stream, generating a second hash on two previous characters of the input data stream, checking in the string table for valid three and two character substrings in accordance with the first hash and the second hash, respectively and declaring a string to be found if all two and three character substrings of a particular string are found in the correct consecutive order.

There is further provided in accordance with the present invention an apparatus for searching the content of an input character stream for the presence of one or more strings comprising a first string table for storing three character substrings of the strings to be searched, a first lookup mechanism for providing a first index to the first string table based on the hash of the previous three characters of the input stream, the first string table outputting a three character substring in accordance with the first index, a second string table for storing two character substrings of the strings to be searched, a second lookup mechanism for providing a second index to the second string table based on the hash of the previous two characters of the input stream, the second string table outputting a two character substring in accordance with the second index, a content search processor operative to declare a string found if all two and three character substrings of a particular string are found in the correct consecutive order.

There is also provided in accordance with the present invention a computer readable storage medium having a computer program embodied thereon for causing a suitably programmed system to search for a plurality of strings by performing the following steps when such program is executed on the system: generating a first hash value on three previous characters received in the input data stream and applying the first hash value to a first hash table, generating a second hash value on two previous characters received in the input data stream and applying the second hash value to a second hash table, retrieving a three character substring stored in a first string table in response to a hit on the first hash table, retrieving a two character substring stored in a second string table in response to a hit on the second hash table and searching for substrings making up a string and declaring a string found if all the one or more two or three character substrings of a particular string are found in correct consecutive order.

BRIEF DESCRIPTION OF THE DRAWINGS

The invention is herein described, by way of example only, with reference to the accompanying drawings, wherein:

FIG. 2A is a diagram illustrating the structure of an entry in the two character string table;

FIG. 2B is a diagram illustrating the structure of an entry in the three character string table;

DETAILED DESCRIPTION OF THE INVENTION

Notation Used Throughout

The following notation is used throughout this document.

| Term | Definition |
| --- | --- |
| ASIC | Application Specific Integrated Circuit |
| CPU | Central Processing Unit |
| DSP | Digital Signal Processor |
| EEPROM | Electrically Erasable Programmable Read Only Memory |
| EEROM | Electrically Erasable Read Only Memory |
| EPROM | Erasable Programmable Read Only Memory |
| FPGA | Field Programmable Gate Array |
| FTP | File Transfer Protocol |
| PC | Personal Computer |
| PDA | Personal Digital Assistant |
| PDU | Protocol Data Unit |
| RAM | Random Access Memory |
| ROM | Read Only Memory |
| TTL | Time To Live |
| WLAN | Wireless Local Area Network |
| WLL | Wireless Local Loop |

Detailed Description of the Invention

The present invention is an apparatus for and a method of searching multiple strings in parallel. The present invention is embodied in a content filter which is suitable for use in applications where an input data string is to be searched for the presence of one or more strings. For example, the content filter can be used in data communication systems to provide a real time search mechanism for searching the payload content of frames or packets in an input data stream. The content filter is operative to simultaneously search for a given set of strings contained within the input stream. The resulting output comprises a list of the matching strings found.

Note that the input stream may comprise any type of input data in accordance with the particular application, such as frames, packets, bytes, PDUs, etc. For illustration purposes only, the input data stream is considered as a sequence of characters. The strings to be searched for are composed of the characters in the input data stream.

Figure 1:
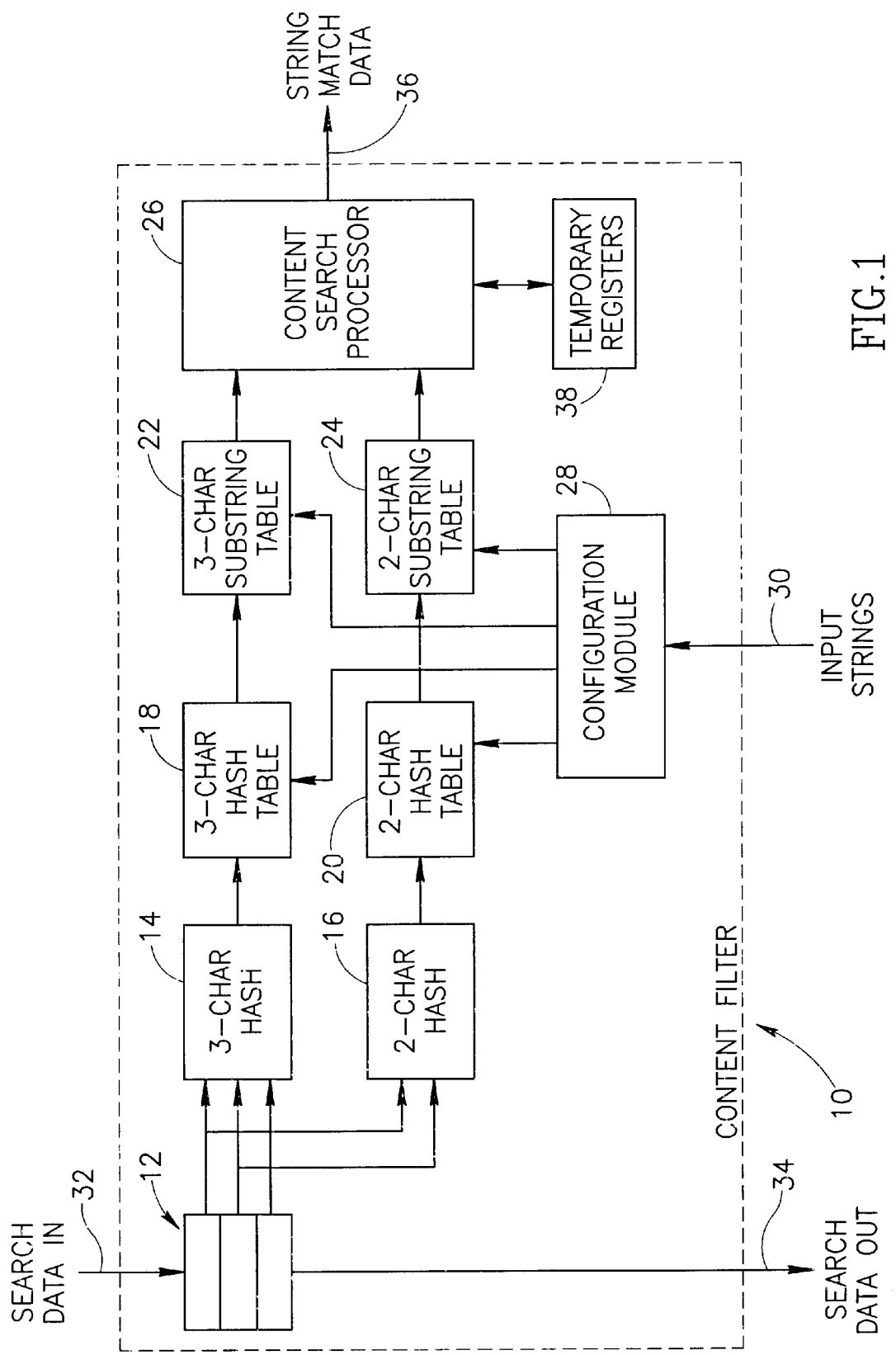
FIG. 1 is a diagram illustrating an example embodiment of the content filter of the present invention.

A diagram illustrating an example embodiment of the content filter of the present invention is shown in FIG. 1. The content filter, generally referenced 10, comprises an input register file 12, 3-character hash function 14, 3-character hash table 18, 3-character string table 22, 2-character hash function 16, 2-character hash table 20, 2-character string table 24, content search processor 26, configuration module 28 and temporary registers 38.

It is noted that the content filter illustrated herein is shown for example purposes only and is not intended to limit the scope of the invention. One skilled in the electrical arts can construct other content filters in accordance with the particular implementation requirements using the principles of the present invention described herein without departing from the spirit and scope of the invention.

The content filter is operative to search the input data stream 32 for a plurality of strings simultaneously. The strings to be searched for are determined a priori, processed and stored in the substring tables 22, 24 during configuration of the content filter. As described in more detail hereinbelow, during configuration, the strings to be searched for are divided into a plurality of two and three character substrings. The substring tables function to store the data structures representing these three and two character substrings. The hash of these substrings are generated and stored in hash tables used to generate an index into the substring tables. During searching, the content filter generates the hash of the input character stream and attempts to find a matching string stored in the table. Thus, hash functions are used both in configuring the filter and during the actual searching of the input data stream to determine whether a particular string is present.

In operation, the input data stream is input to registers 12 which comprise three registers for temporarily storing three characters of the input stream. The registers effectively create a three and two character sliding window into the input stream. The characters are clocked in and their hash values calculated using hash functions 14, 16. Depending on the implementation, the characters are then output as an output data stream 34 or alternatively may be discarded.

Both a three character hash and a two character hash are generated. The three character hash function 14 is taken over the most recent three characters in the input stream while the two character hash function is taken over the most recent two characters in the input stream. The three and two character hash functions may comprise any suitable function, such as exclusive OR (XOR) wherein an exclusive OR (XOR) of the three or two characters with each other is generated. More sophisticated hash functions may also be used so as to obtain a particular distribution density function of hits.

The 3-character hash value generated is used as an index to the 3-character hash table. Similarly, the 2-character hash value generated is used as an index to the 2-character hash table. The 3-character hash table stores pointers to substring entries in the 3-character substring table. Similarly, the 2-character hash table stores pointers to substring entries in the 2-character substring table.

The three and two character substrings found are input to the content search processor which functions to determine whether all the substrings making up a string have been found. In order for a string to be declared found, all its substrings must have been found in the correct consecutive order.

The structure of the substring table entries will now be described in more detail. A diagram illustrating the structure of an entry in the two character string table is shown in FIG. 2A. The two character table entry, generally referenced 40, comprises a 9-bit previous index/application field 42, ignore case bit 44, ignore application bit 46, a 1-bit field 48 to indicate that the substring is the first in the string, a 1-bit field 50 to indicate that the substring is the last in the string, a 1-bit field 52 to indicate that the entry is the last of multiple entries for a particular hash value, and two byte fields 54, 56 for storing the two characters, char #1 and char #2 making up the substring.

A diagram illustrating the structure of an entry in the three character string table is shown in FIG. 2B. The structure of the three character table entry, generally referenced 60, is similar to that of the two character table with the addition of a third character, char #3. In particular, the table comprises a 9-bit previous index/application field 62, ignore case bit 64, ignore application bit 66, a 1-bit field 68 to indicate that the substring is the first in the string, a 1-bit field 70 to indicate that the substring is the last in the string, a 1-bit field 72 to indicate that the entry is the last of multiple entries for a particular hash value, and three byte fields 74, 76, 78 for storing the three characters, char #1, char #2 and char #3 making up the substring.

Figure 3:
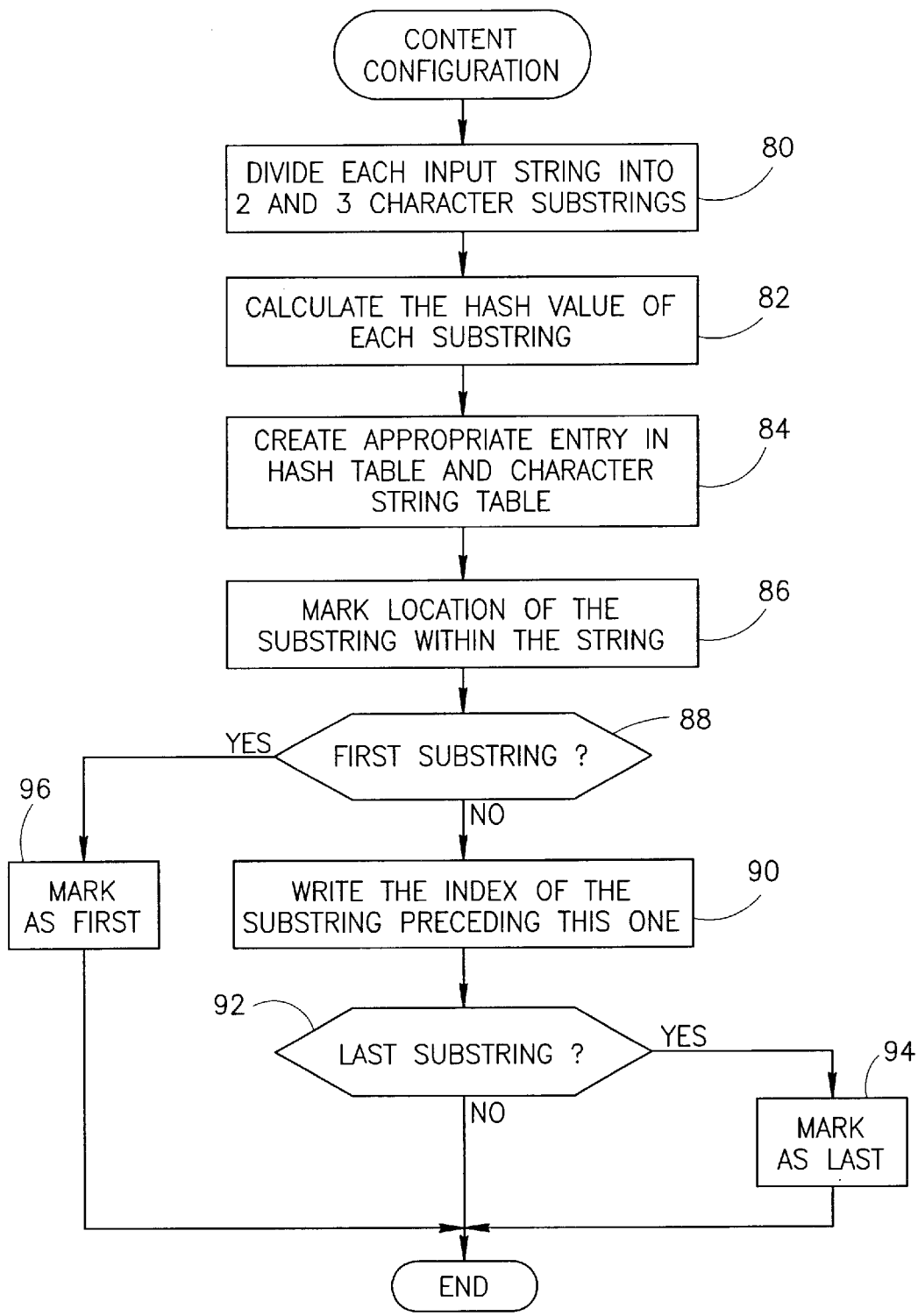
FIG. 3 is a flow diagram illustrating the method of constructing the contents of the three and two character string tables in accordance with the present invention.

The configuration process portion of the present invention will now be described in more detail with reference to FIGS. 1, 2A, 2B and 3. A flow diagram illustrating the method of constructing the contents of the three and two character string tables in accordance with the present invention is shown in FIG. 3. The configuration module 28 is adapted to perform the content configuration method of the present invention.

As described previously, the strings to be searched must be determined beforehand and processed. A string must comprise at least two characters in order for it to be searched. The first step is to divide the entire set of strings into two and three character substrings (step 80). As long a string contains two or more characters, it can be broken down into two and three character substrings.

The hash of every three and two character substring is generated using any suitable hash function, e.g., exclusive or (step 82). The output of the hash function comprises an 8-bit pointer to the corresponding hash look up table. Entries are then created in both the hash tables and the substring tables (step 84). Note that the hash tables are initialized with null values while the substring tables may optionally be initialized. A null value indicates that there are no substrings in the substring table for that particular hash value.

In the example embodiment presented herein, the three and two character hash tables comprise 256 entries each wherein the 8-bit hash result is used as an index thereto. The hash tables output an 8-bit index into the substring tables. The three character substrings are placed in the three character substring table while the two character substrings are placed in the two character substring table. Both substring tables comprises 256 entries wherein the 8-bit hash pointer is used as an index thereto. A pointer to the particular entry in the substring table is stored in the appropriate location in the hash table (step 86). The location in the hash table corresponds to the hash value of the substring.

Thus, during operation, the hash of the input stream characters serves as the index to the hash tables. In the event of a hit, the pointer in the hash table functions to point to a corresponding entry in one of the substring tables. The substring is read out and input to the content search processor.

Next, the fields in the table entry are filled as follows. If the substring is the first substring in the string (step 88), the first substring field is set (step 96). If the substring is not the first, the index (i.e. address location) of the previous substring within the string is written to the previous index field of the current substring (step 90). If the substring is the last substring of the string (step 92), the last substring field is set to indicate this (step 94).

Note that if multiple substrings generate the same hash value, all the entries corresponding to this hash value are stored in the same section of the substring table. There may be many strings that comprise the same substring. In this case, it is likely that each has a different previous index. In addition, the same substring may be the first, last or intermediate substring in a particular string. Each case where the same substring appears in a different string, an additional entry is created with the fields set to the appropriate values. Thus, during searching, all the substrings located in the same area of the substring table that correspond to the same hash pointer, are read and processed by the content search processor.

In the case of multiple identical substrings, the location of the first substring in the group is stored as the pointer location in the hash table. In addition, the last string field of all but the last substring is cleared. The last string field of the last substring in the group is set to indicate that there are no more substrings stored in the substring table for that particular hash value.

Note that there is no previous index for the first substring in a string. Optionally, the 9-bit field for the substring can be used to store additional information such as the particular application (or port) associated with the string. In the example presented herein, both the first two character substring entry and the first three character substring entry are used to store the application.

It is noted that using a 256 entry three and two character substring table provides sufficient storage for a total of 1,250 characters. This value is derived from the sum of 256×3 characters and 256×2 characters. It is appreciated that larger or smaller substring tables may be constructed with corresponding different size hash tables depending on the requirements of the particular application.

Once all the strings have been divided into substrings, their hash values calculated and the corresponding entries in the hash tables and substring tables created, the configuration phase is complete. The content filter is now ready to process characters in the input data stream. The hash of the input characters is used to index the substring table. Substrings found are input to the content search processor which is adapted to check the order the substrings are found using the previous index fields of the substring table entries. If all the substrings making up a string are found in the correct consecutive order, the string is declared found. The content search processor stores the substring information in found substring temporary registers. Found strings are stored in status registers.

Figure 4:
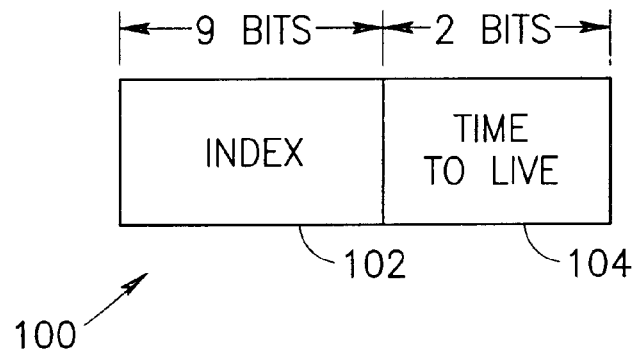
FIG. 4 is a diagram illustrating the found substring temporary register used in determining the substrings making up a string.

A diagram illustrating the found substring temporary register used in determining the substrings making up a string is shown in FIG. 4. The found substring temporary register, generally referenced 100, comprises at least two fields: a 9-bit index field 102 and a 2-bit time to live (TTL) field 104. The TTL field is used in determining whether the substrings found are consecutive with respect to each other.

Figure 5:
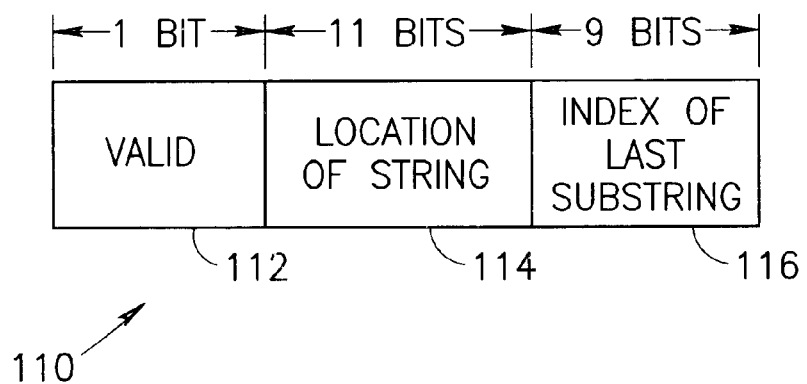
FIG. 5 is a diagram illustrating the status register used to provide the location and index of found strings.

A diagram illustrating the status register used to provide the location and index of found strings is shown in FIG. 5. The status register, generally referenced 110, comprises a 1-bit valid field to indicate whether the contents of the register are valid, an 11-bit location field 114 representing the location of the last character of the string within the payload of the frame or packet and a 9-bit field 116 of the index of the last substring in the particular substring table.

Figure 6:
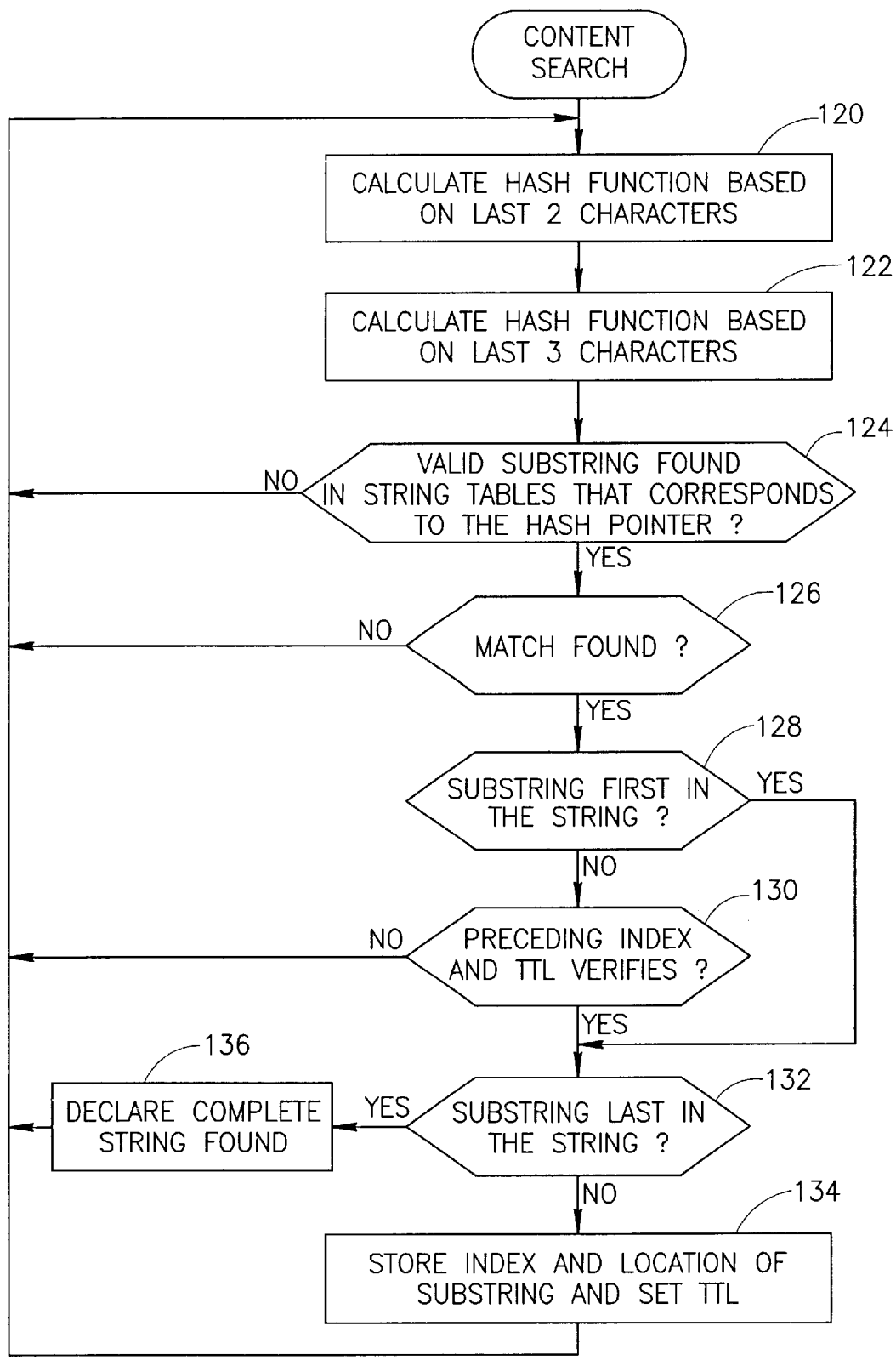
FIG. 6 is a flow diagram illustrating the method of searching an input data stream for a plurality of strings in accordance with the present invention.

The operation of the content filter during searching will now be described in more detail. A flow diagram illustrating the method of searching an input data stream for a plurality of strings in accordance with the present invention is shown in FIG. 6. As described previously, the input characters are clocked into the registers 12 (FIG. 1). The hash on the most recent two characters is calculated (step 120) and the lash on the most recent three characters is also calculated (step 122) by the 2-character hash 16 and three character hash 14, respectively.

The hash values are used as look ups to the hash tables. The pointer in the hash table is used as an index to the substring tables. In the event of a hit on the hash table (i.e. the contents of the location is non-null), the one or more substrings in the substring table corresponding to the pointer are read out (step 124). In the case of a single entry corresponding to the hash pointer, the input characters are compared with the substring. In the case of multiple entries corresponding to the hash pointer, the input characters are compared with each substring in the group.

If a match is found (step 126), the first substring field is checked to see if the substring is the first in the string (step 128). If it is, it is then checked whether the substring is the last within the string (step 132). Note that it is possible that a string is comprised of a single substring. In this case, the first and last substring fields in the character table entry will be set.

If it is not the last substring in the string, then a found substring temporary register is created and the index corresponding to the substring is stored in the register (step 134). The index comprises 9 bits made up of a bit to indicate either the three or two character substring table and the 8-bit address of the entry within the particular substring table.

In addition, the 2-bit time to live field is initialized to the value three. The TTL field is used by the content search processor in determining whether two substrings are consecutive with each other in the input data stream. Each character clock, the TTL field is decremented by one. If the TTL field of a substring reaches zero the substring is discarded since no substring consecutive to this one was found.

If the substring is not the first substring in the string (step 128), the index and the TTL fields of the previous substring are verified (step 130). When a substring is received, the content search processor examines the previous index field of the substring entry. A bit indicating either the three or two character substring table is added to the previous index field resulting in a 9-bit index. The processor then searches for a temporary register having a matching index field. If a match is found, the TTL field is examined. If the current substring is two characters, the TTL is checked for a value of two. If the current substring is three characters, the TTL is checked for a value of one. Note that this assumes that the TTL field is decremented at the end of each character processing cycle.

Alternatively, depending on the particular implementation, the time to live field may comprise a different length, e.g., three bits. The operation, however, is the same in that the field is used to indicate the 'freshness' of the substring. A substring for which no subsequent substring was found within the appropriate time is discarded.

Thus, for a substring to be considered in the correct consecutive order, a temporary register must be found whose index matched that of the previous index field of the newly found substring. In addition, the TTL field must be set to the proper value. For a particular substring, if the next substring is three characters long, than the TTL count will decrement to one since a substring match cannot be detected until the next three characters are clocked in. Likewise, if the next substring is two characters long, than the TTL count will decrement to two since a substring match cannot be detected until the next two characters are input.

If the index and TTL fields verify correctly (step 130), it is then checked if the substring is the last in the string (step 132). If it is, the string is declared as found and a status register is written with the valid bit set, location of the string and the index of the last substring. Depending on the application, the information is forwarded to another module for further processing.

Note that in the embodiment shown, the substrings making up a string are not saved during the search process. Thus, upon finding a complete string, only the index of the last substring and its location in the input stream is provided. Note that the location in the input stream may comprise the location in the payload portion of a frame or the location in the input stream since the search was begun. It is noted that subsequent processing stages can easily construct the string found by referencing the previous index field of each substring in backwards fashion starting with the last substring indicated in the status register. Alternatively, the content filter may comprise means for reconstructing the entire string.

If the substring is not the last in the string (step 132), substring information including the 9-bit index and TTL field is stored in a temporary register (step 134). The TTL field is initialized to three and decremented at each character clock cycle. If the TTL field decrements to zero, the content of the corresponding temporary register is discarded.

Thus, in this fashion, the content search processor guarantees that the substrings making up a string must be in the correct consecutive order in order for a string to be declared as found.

Note that in alternative embodiments, the string search can be limited depending upon one or more criteria. For example, the search can be limited to strings associated with a particular application or port. In this case, the application or port field of the first substring in the string is checked before the search process continues. If the field contains an application or port not in the allowed set, the substring is discarded.

Further options can be defined depending on the application requirements. For example, the ignore case field can be used to instruct the content search processor to declare a string found regardless of whether the input characters are upper or lower case thus making the string search case insensitive. In addition, the string search can be performed regardless of the particular application associated with a string. If this bit is set, the application field of the first substring is ignored.

Thus, the content filter of the present invention can be used to filter an input character stream for the presence of a set of strings. For example, the set of strings may comprise the relevant strings associated with one or more communication protocols.

Computer Embodiment

Figure 7:
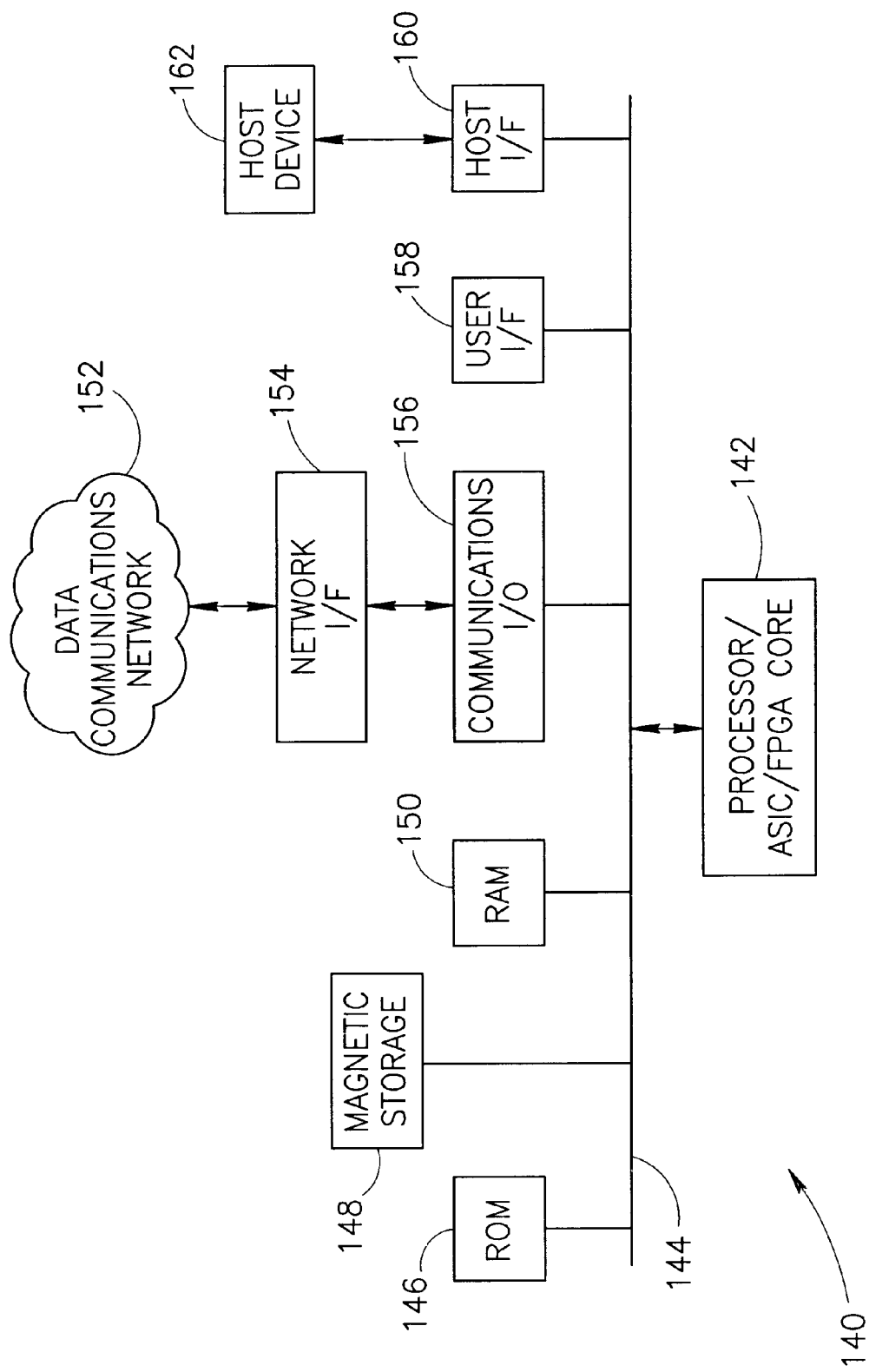
FIG. 7 is a block diagram illustrating an example computer processing system adapted to perform the multiple parallel string search method of the present invention.

In another embodiment, a computer is operative to execute software adapted to perform the noise normalization method of the present invention. A block diagram illustrating an example computer processing system adapted to perform the multiple parallel string search method of the present invention is shown in FIG. 7. The system may be incorporated within a communications device such as a PDA, cellular telephone, cable modem, broadband modem, laptop, PC, network transmission or switching equipment, network device or any other wired or wireless communications device. The device may be constructed using any combination of hardware and/or software.

The computer system, generally referenced 140, comprises a processor 142 which may be implemented as a microcontroller, microprocessor, microcomputer, ASIC core, FPGA core, central processing unit (CPU) or digital signal processor (DSP). The system further comprises static read only memory (ROM) 146 and dynamic main memory (e.g., RAM) 150 all in communication with the processor. The processor is also in communication, via a bus 144, with a number of peripheral devices that are also included in the computer system.

The device is connected to a data communications network 152 via a network interface 154. The interface comprises wired and/or wireless interfaces to one or more communication channels. Communications I/O processing 156 transfers data between the network interface and the processor. A optional user interface 158 responds to user inputs and provides feedback and other status information. A host interface 160 connects a host device 162 to the system. The host is adapted to configure, control and maintain the operation of the system. The system also comprises magnetic storage device 148 for storing application programs and data. The system comprises computer readable storage medium which may include any suitable memory means including but not limited to magnetic storage, optical storage, semiconductor volatile or non-volatile memory, biological memory devices, or any other memory storage device.

The multiple parallel string search method software is adapted to reside on a computer readable medium, such as a magnetic disk within a disk drive unit. Alternatively, the computer readable medium may comprise a floppy disk, Flash memory card, EPROM, EEROM, EEPROM based memory, bubble memory storage, ROM storage, etc. The software adapted to perform the multiple parallel string search method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of searching for one or more strings in an input data stream, said method comprising the steps of:
generating a first hash value on three previous characters received in said input data stream and applying said first hash value to a first hash table;
generating a second hash value on two previous characters received in said input data stream and applying said second hash value to a second hash table;

retrieving a three character substring stored in a first string table in response to a hit on said first hash table;

retrieving a two character substring stored in a second string table in response to a hit on said second hash table; and searching for substrings making up a string and declaring a string found if all the one or more two or three character substrings of a particular string are found in correct consecutive order.

2. The method according to claim 1, wherein said step of generating a first hash value comprises calculating the exclusive or of said three previous characters.

3. The method according to claim 1, wherein said step of generating a second hash value comprises calculating the exclusive or of said two previous characters.

4. The method according to claim 1, wherein said step of applying said first hash value comprises looking up a pointer to said first string table in said first hash table using said first hash value as an index.

5. The method according to claim 1, wherein said step of applying said second hash value comprises looking up a pointer to said second string table in said second hash table using said second hash value as an index.

6. The method according to claim 1, wherein said step of searching for substrings comprises the steps of:

storing three character and two character substrings that match corresponding substrings in said input data stream in a temporary register and initializing a time to live field associated therewith;

if a substring is not the first within a string, determining that the substring is in correct consecutive order if the preceding substring was found and its time to live field is non-zero;

if the substring is the last within a string, declaring the string found; and if the substring is not the last within a string, storing an index and time to live field associated therewith in a corresponding temporary register.

7. The method according to claim 6, wherein the time to live field in each temporary register is decremented by one upon each input character.

8. The method according to claim 6, wherein a substring is rejected when its time to live field reaches zero.

9. The method according to claim 1, further comprising the step of constructing said first string table by dividing each string to be searched into one or more substrings of three or two characters and storing all three character substrings in said first string table.

10. The method according to claim 9, wherein said three character substrings are stored in said first string table in accordance with the hash function thereof.

11. The method according to claim 1, further comprising the step of constructing said second string table by dividing each string to be searched into one or more substrings of three or two characters and storing all two character substrings in said second string table.

12. The method according to claim 11, wherein said two character substrings are stored in said second string table in accordance with the hash function thereof.

13. A method of searching for one or more strings in an input data stream, said method comprising the steps of:

dividing each string to be searched for into one or more substrings of three or two characters and storing said three or two character substrings in a string table in accordance with the hash function thereof;

generating a first hash on three previous characters of said input data stream;

generating a second hash on two previous characters of said input data stream;

checking in said string table for valid three and two character substrings in accordance with said first hash and said second hash, respectively; and declaring a string to be found if all two and three character substrings of a particular string are found in the correct consecutive order.

14. The method according to claim 13, wherein said step of generating a first hash value comprises calculating the exclusive or of said three previous characters.

15. The method according to claim 13, wherein said step of generating a second hash value comprises calculating the exclusive or of said two previous characters.

16. The method according to claim 13, wherein said step of checking in said string table comprises looking up a pointer to said string table using said first hash value as an index.

17. The method according to claim 13, wherein said step of checking in said string table comprises looking up a pointer to said string table using said second hash value as an index.

18. The method according to claim 13, wherein said step of declaring a string to be found comprises the steps of:

storing three character and two character substrings that match corresponding substrings in said input data stream in a temporary register and initializing a time to live field associated therewith;

if a substring is not the first within a string, determining that the substring is in correct consecutive order if the preceding substring was found and its time to live field is non-zero;

if the substring is the last within a string, declaring the string found; and if the substring is not the last within a string, storing an index and time to live field associated therewith in a corresponding temporary register.

19. The method according to claim 18, wherein the time to live field in each temporary register is decremented by one upon each input character.

20. The method according to claim 18, wherein a substring is rejected when its time to live field reaches zero.

21. An electronic data storage media storing a computer program adapted to program a computer to execute the parallel string search process of claim 13.

22. An apparatus for searching the content of an input character stream for the presence of one or more strings, comprising:

a first string table for storing three character substrings of said strings to be searched;

a first lookup mechanism for providing a first index to said first string table based on the hash of the previous three characters of said input stream, said first string table outputting a three character substring in accordance with said first index;

a second string table for storing two character substrings of said strings to be searched;

a second lookup mechanism for providing a second index to said second string table based on the hash of the previous two characters of said input stream, said second string table outputting a two character substring in accordance with said second index;

a content search processor operative to declare a string found if all two and three character substrings of a particular string are found in the correct consecutive order.

23. The apparatus according to claim 22, wherein said first string table is constructed by dividing each string to be searched into one or more substrings of three or two characters and storing all three character substrings in said first string table.

24. The apparatus according to claim 23, wherein said three character substrings are stored in said first string table in accordance with the hash function thereof.

25. The apparatus according to claim 22, wherein said second string table is constructed by dividing each string to be searched into one or more substrings of three or two characters and storing all two character substrings in said second string table.

26. The apparatus according to claim 25, wherein said two character substrings are stored in said second string table in accordance with the hash function thereof.

27. The apparatus according to claim 22, wherein said first lookup mechanism comprises:

a hash function for calculating the hash of the previous three characters of said input stream; and a hash table adapted to output a pointer to said first string table in response to said hash.

28. The apparatus according to claim 27, wherein said step of generating a first hash value comprises calculating the exclusive or of said three previous characters.

29. The apparatus according to claim 22, wherein said second lookup mechanism comprises:

a hash function for calculating the hash of the previous two characters of said input stream; and a hash table adapted to output a pointer to said second string table in response to said hash.

30. The apparatus according to claim 29, wherein said step of generating a second hash value comprises calculating the exclusive or of said two previous characters.

31. The apparatus according to claim 22, wherein said content search processor comprises processing means programmed to:

store three character and two character substrings output of said first string table and said second string table, respectively, in a temporary register and initializing a time to live field associated therewith;

determine that the substring is in correct consecutive order if the preceding substring was found and its time to live field is non-zero;

declare the string found if the substring is the last within a string; and store an index and time to live field associated with the substring in a corresponding temporary register if the substring is not the last within a string.

32. The apparatus according to claim 29, wherein the time to live field in each temporary register is decremented by one upon each input character.

33. The apparatus according to claim 29, wherein a substring is rejected when its time to live field reaches zero.

34. The apparatus according to claim 22, wherein said apparatus for searching the content of an input character stream for the presence of one or more strings is implemented in a field programmable gate array (FPGA).

35. The apparatus according to claim 22, wherein said apparatus for searching the content of an input character stream for the presence of one or more strings is implemented in an application specific integrated circuit (ASIC).

36. A computer readable storage medium having a computer program embodied thereon for causing a suitably programmed system to search for a plurality of strings by performing the following steps when such program is executed on said system:

generating a first hash value on three previous characters received in said input data stream and applying said first hash value to a first hash table;

generating a second hash value on two previous characters received in said input data stream and applying said second hash value to a second hash table;

retrieving a three character substring stored in a first string table in response to a hit on said first hash table;

retrieving a two character substring stored in a second string table in response to a hit on said second hash table; and searching for substrings making up a string and declaring a string found if all the one or more two or three character substrings of a particular string are found in correct consecutive order.

* * * * *